Aug. 26, 1952  H. SCHURMANN  2,608,009
SCOOP DUMPING MECHANISM
Filed Nov. 13, 1950  2 SHEETS—SHEET 1

Inventor
Harold Schurmann
By Arthur H. Sturges
Attorney

Aug. 26, 1952    H. SCHURMANN    2,608,009
SCOOP DUMPING MECHANISM
Filed Nov. 13, 1950    2 SHEETS—SHEET 2

Inventor
Harold Schurmann
By Arthur H. Sturges
Attorney

Patented Aug. 26, 1952

2,608,009

UNITED STATES PATENT OFFICE 2,608,009

SCOOP DUMPING MECHANISM

Harold Schurmann, Hildreth, Nebr., assignor of one-half to Ora F. Lindau, Hildreth, Nebr.

Application November 13, 1950, Serial No. 195,197

3 Claims. (Cl. 37—134)

1

This invention relates to a scoop of the type provided in the form of an attachment and adapted to be mounted on a tractor, and in particular, a scoop positioned between a pair of frames formed with upper and lower parallel bars wherein with the frames attached to the rear axle housing of a tractor whereby the scoop is positioned to follow the tractor, the scoop is readily actuated to scooping, carrying and dumping positions.

The purpose of this invention is to provide means for attaching a scoop to the rear axle housing of a tractor so that the scoop may be used for leveling and conveying soil and the like.

Various mounting devices in the form of attachments having been provided for mounting scoops on tractors, particularly with the scoop extended from the forward end of the tractor, but for universal use it has been found desirable to provide a scoop mounting attachment wherein the scoop may be used for scraping, leveling and conveying soil and other materials. With this thought in mind, this invention contemplates a scoop in the form of a rectangular shaped bucket pivotally mounted between frames and having combinations of levers for holding the scoop in various operating positions.

The object of this invention is, therefore, to provide means for mounting a scoop in an attachment having means thereon for connecting the parts to the rear axle housing of a tractor in which the scoop may readily be operated to scooping, carrying and dumping positions from a tractor to which it is attached.

Another object of the invention is to provide a scoop mounting frame whereby a scoop may be attached to the rear axle housing of a tractor wherein the scoop may be elevated for carrying products in transportation and may be rotated for dumping, through levers mounted on the frame and actuated from the tractor.

A further object of the invention is to provide an attachment for mounting a scoop on a tractor with the scoop following the tractor wherein the scoop may be used for leveling and conveying, which is of a comparatively simple and economical construction.

With these and other objects and advantages in view, the invention embodies a scoop pivotally mounted between frames attached to and extended rearwardly from the rear axle housing of a tractor with the scoop mounted to be elevated by the power lift of the tractor to a position for conveying soil from one location to another and with the mounting means including a lever actuated latch for releasing the scoop for dumping.

2

Other features and advantages of the invention will appear from the following description taken in connection with the drawings, wherein.

Figure 1:
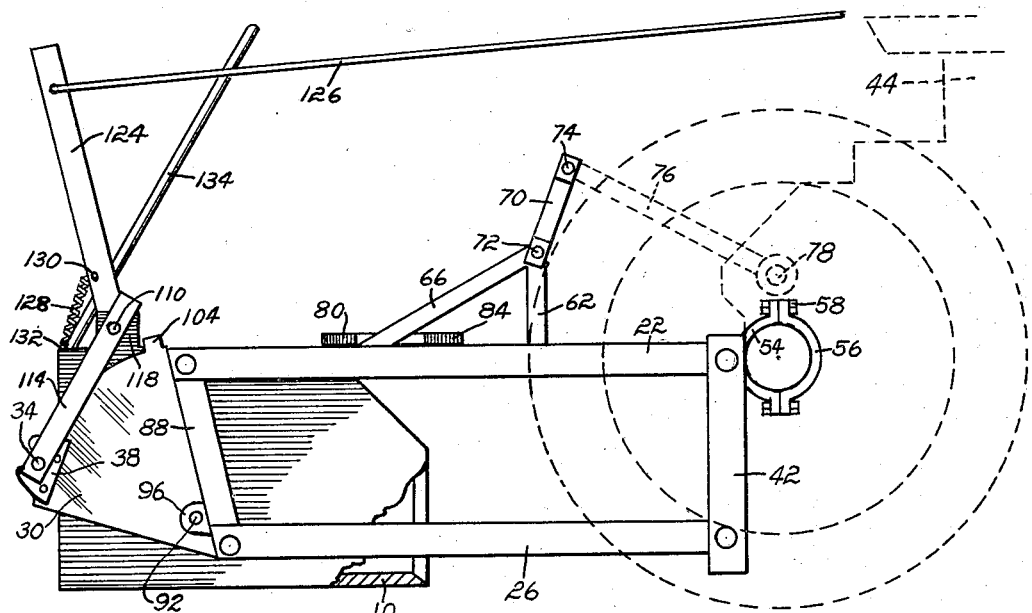
Figure 1 is a side elevational view showing the scoop attachment mounted on the rear axle housing of a tractor with the scoop in operative position and with parts of the tractor shown in dotted lines.
Figure 2:
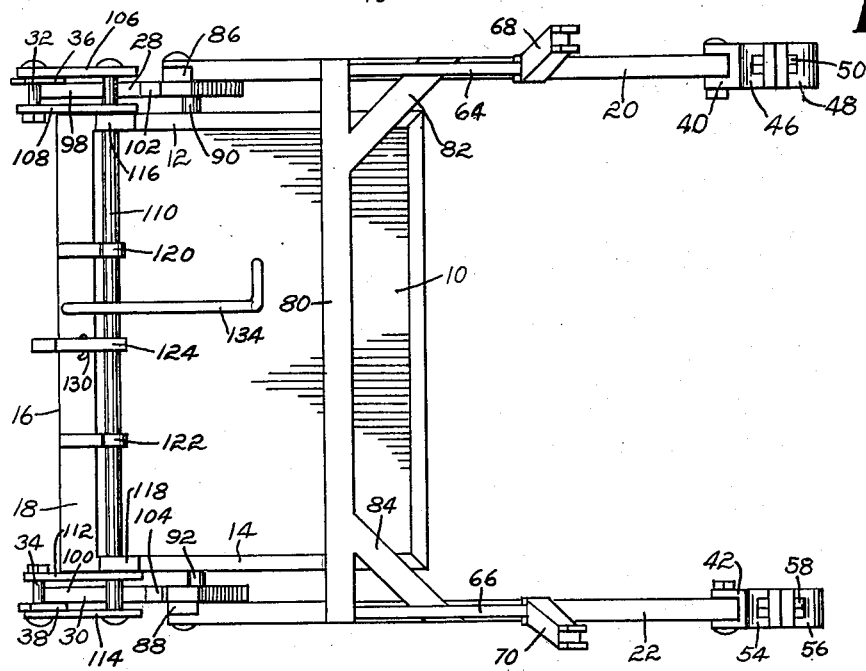
Figure 2 is a plan view showing the scoop and mounting attachment thereof.
Figure 3:
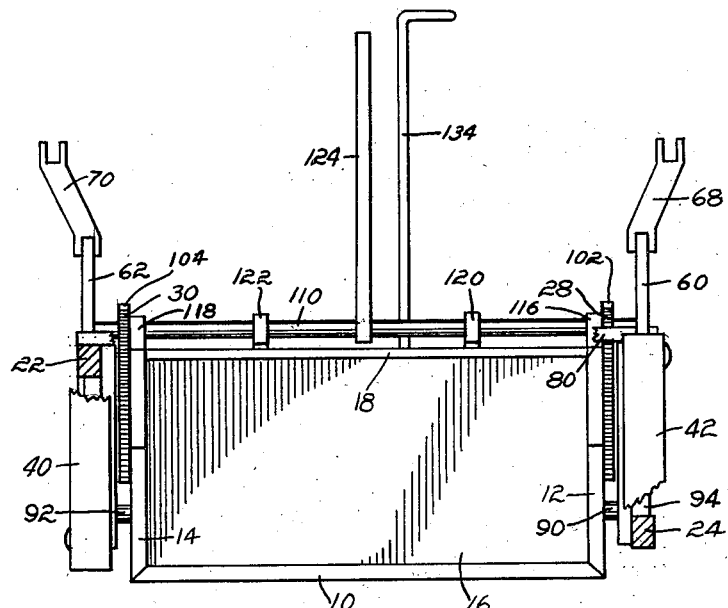
Figure 3 is a front elevational view showing the scoop and mounting elements, and wherein parts are broken away and shown in section.
Figure 4:
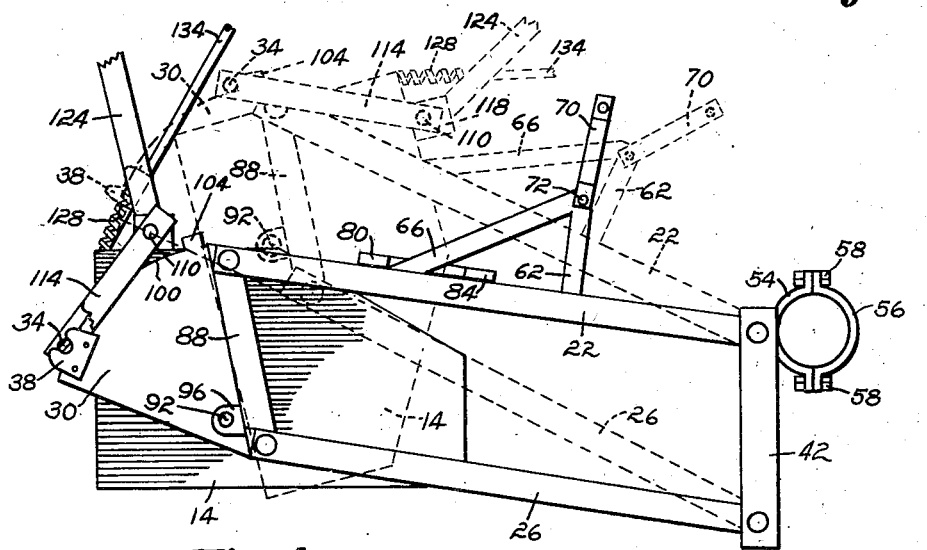
Figure 4 is a side elevational view similar to that shown in Figure 1 showing the parts with the scoop in the elevated position in full lines and the dumping position, in dotted lines.

Referring now to the drawings wherein like reference characters denote corresponding parts, the improved scoop attachment of this invention includes a scoop having a bottom plate 10 with side plates 12 and 14, a back plate 16, and a flange 18 which is extended forwardly from the upper edge of the back plate, and this scoop is pivotally mounted between side frames having upper bars 20 and 22, lower bars 24 and 26, segments 28 and 30 and latches including pins 32 and 34 and sockets 36 and 38.

The bars of the side frames are pivotally mounted in vertically disposed channel shaped links 40 and 42. The links 40 and 42 are suspended from the rear axle housing of a tractor 44 with the link 40 provided with a clamp section 46 that is attached to a section 48 by bolts 50, and the link 42 provided with a similar clamp having a section 54 which is secured to a complementary section 56 by bolts 58.

The upper bars 20 and 22 of the side frames are provided with struts 60 and 62 which are supported by braces 64 and 66, and links 68 and 70, which are pivotally attached to the struts 60 and 62, by bolts 72, are pivotally connected by bolts 74 to a power lift link 76 of a power take-off shaft 78 of the tractor 44, the parts 76 and 78, being conventional, are indicated by dotted lines. The upper bars 20 and 22 are supported by a transverse brace 80 with the corners supported by diagonal bars 82 and 84.

The outer ends of the bars of the frames are connected by upwardly and rearwardly inclined links 86 and 88 and the segments 28 and 30 extend from these links.

The side plates 12 and 14 of the scoop are provided with stub shafts 90 and 92 and these shafts extend through the plates 28 and 30, respectively, and also through lugs 94 and 96 which extend from the rear surfaces of the links 86 and 88. By this means the scoop is pivotally mounted in the segments and also in the lugs extended rearwardly from the links connecting the rear ends of the bars of the frams.

The segments 28 and 30 are provided with arcuate upper surfaces 98 and 100, and these surfaces are described by radii from the centers of the stub shafts 90 and 92.

The latches 36 and 38 are positioned on the lower corners of the segments and the upper corners are provided with projections 102 and 104 which are positioned to provide stops for the pins 32 and 34 for limiting the dumping movement of the scoop.

The pin 32 provides connecting means for the lower ends of links 106 and 108 which are pivotally mounted on the end of a shaft 110 and the pin 34 provides similar connecting means for links 112 and 114 on the opposite end of the shaft. The shaft 110 is journaled in bearings 116 and 118 extended upwardly from the side plates of the bucket and also bearings 120 and 122 extended upwardly from the flange 18 on the upper edge of the rear wall of the bucket.

The shaft 110 is also provided with a lever 124 and a cable 126, which is connected to the upper end of the lever, extends forwardly to the tractor so that an operator on the tractor may draw the upper end of the lever forwardly to release the pins 32 and 34 from the sockets 36 and 38 of the latches to release the scoop for dumping.

A spring 128 is connected to the lever 124 at the point 130 and to the flange 18 of the upper edge of the scoop at the point 132 whereby the lever is resiliently held rearwardly so that the pins 32 and 34 are urged into the sockets 36 and 38.

The flange 18 of the scoop is also provided with a handle 134 by which an operator on the tractor may move the scoop rearwardly and downwardly to return the scoop to the operative position, as illustrated in Figure 1, after the scoop is dumped.

With the parts arranged in this manner the forward ends of the side frames may readily be clamped to the rear axle housing of a tractor and the scoop may be used for leveling or for scraping up soil, and conveying the soil to a remote point where it may readily be dumped.

It will be understood that although the clamping elements at the forward ends of the frames are illustrated as being semi-cylindrical whereby the device may readily be attached to a cylindrical housing, the elements of the clamp may be of any suitable shape or design so that the device may be attached to an axle housing of a different shape.

From the foregoing description it is thought to be obvious that a tractor scoop constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not to be understood that the invention is limited to the precise arrangement and formation of the several parts herein shown, except as claimed.

Having thus fully described the invention what I claim is new and desire to secure by Letters Patent is:

1. A scoop mounting attachment comprising a pair of side frames each having an upper horizontally disposed bar, a lower bar substantially parallel to the upper bar and vertically disposed links connecting the ends of the horizontally disposed bars, means for mounting the forward ends of the frames to the rear axle housing of a tractor, substantially triangular shaped segments having arcuate upper outer surfaces carried by the rear ends of the frames, said segments having notches spaced from the lower ends of the arcuate surfaces and lugs providing stops at the upper ends of said surfaces, a scoop positioned between the said frames, means pivotally mounting the said scoop in the said segments and frames at points corresponding with the centers of the radii of the arcuate surfaces of the segments, a shaft journaled on the upper part of the scoop, links having pins therein carried by the shaft and extended downwardly over the said segments with the pins thereof positioned in the notches of the segments with the scoop in the scooping position, means connecting the said side frames to a power lift of the tractor for elevating the scoop, and means actuating the said shaft to release the pins of the downwardly extended links from the notches of the segments for dumping the scoop.

2. A scoop mounting attachment comprising a pair of side frames each having an upper horizontally disposed bar, a lower bar substantially parallel to the upper bar and vertically disposed links connecting the ends of the horizontally disposed bars, means for mounting the forward ends of the frames to the rear axle housing of a tractor, substantially triangular shaped segments having arcuate upper outer surfaces carried by the rear ends of the frames, said segments having notches spaced from the lower ends of the arcuate surfaces and lugs providing stops at the upper ends of said surfaces, a scoop positioned between the said frames, means pivotally mounting the said scoop in the said segments and frames at points corresponding with the centers of the radii of the arcuate surfaces of the segments, a shaft journaled on the upper part of the scoop, links having pins therein carried by the shaft and extended downwardly over the said segments with the pins thereof positioned in the notches of the segments with the scoop in the scooping position, means connecting the said side frames to a power lift of the tractor for elevating the scoop, means actuating the said shaft to release the pins of the downwardly extended links from the notches of the segments for dumping the scoop, and means resiliently urging the said pins into the said notches.

3. A scoop mounting attachment comprising a pair of side frames each having an upper horizontally disposed bar, a lower bar substantially parallel to the upper bar and vertically disposed links connecting the ends of the horizontally disposed bars, means for mounting the forward ends of the frames to the rear axle housing of a tractor, substantially triangular shaped segments having arcuate upper outer surfaces carried by the rear ends of the frames, said segments having notches spaced from the lower ends of the arcuate surfaces and lugs providing stops at the upper ends of said surfaces, a scoop positioned between the said frames, means pivotally mounting the said scoop in the said segments and frames at points corresponding with the centers of the radii of the arcuate surfaces of the segments, a shaft journaled on the upper part of the scoop, links having pins therein carried by the shaft and extended downwardly over the said segments with the pins thereof positioned in the notches of the segments with the scoop in the scooping position, means connecting the said side frames to a power lift of the tractor for elevating the scoop, a lever extended upwardly from the shaft, a cable extended from the upper end of the lever to the tractor upon which the attachment is mounted, and a spring connected, at one end, to the lever, and at the other to the upper end of the scoop for urging the said pins into the said notches.

HAROLD SCHURMANN.

REFERENCES CITED

The following references are of record in the file of this patent:

UNITED STATES PATENTS

| Number | Name | Date |
|---|---|---|
| 2,390,040 | F. B. Arps | Dec. 4, 1945 |
| 2,433,019 | B. F. Arps | Dec. 23, 1947 |
| 2,548,461 | B. F. Arps | Apr. 10, 1951 |